(12) United States Patent
Honkomp et al.

(10) Patent No.: US 11,345,243 B2
(45) Date of Patent: May 31, 2022

(54) METHOD FOR OPERATING AN ELECTRICAL CIRCUIT, ELECTRICAL CIRCUIT AND MOTOR VEHICLE

(71) Applicant: AUDI AG, Ingolstadt (DE)

(72) Inventors: Franz Honkomp, Ingolstadt (DE); Bastian Heidler, Kranzberg (DE)

(73) Assignee: AUDI AG, Ingolstadt (DE)

(*) Notice: Subject to any disclaimer, the term of this patent is extended or adjusted under 35 U.S.C. 154(b) by 39 days.

(21) Appl. No.: 17/069,211

(22) Filed: Oct. 13, 2020

(65) Prior Publication Data

US 2021/0221236 A1 Jul. 22, 2021

(30) Foreign Application Priority Data

Jan. 16, 2020 (DE) ............... 10 2020 100 961.5

(51) Int. Cl.
| | | |
|---|---|---|
| *H02P 1/00* | (2006.01) | |
| *H02P 3/00* | (2006.01) | |
| *H02P 5/00* | (2016.01) | |
| *B60L 50/51* | (2019.01) | |
| *H02P 27/06* | (2006.01) | |
| *B60L 50/70* | (2019.01) | |
| *B60L 50/60* | (2019.01) | |

(52) U.S. Cl.
CPC ............ *B60L 50/51* (2019.02); *B60L 50/60* (2019.02); *B60L 50/70* (2019.02); *H02P 27/06* (2013.01); *B60L 2240/421* (2013.01); *B60L 2240/423* (2013.01)

(58) Field of Classification Search
CPC .......... B60L 50/51; B60L 50/60; B60L 50/70; H02P 27/06

USPC ....................................................... 318/139
See application file for complete search history.

(56) References Cited

U.S. PATENT DOCUMENTS

| | | | | |
|---|---|---|---|---|
| 9,106,162 | B2* | 8/2015 | Isayeva | B60K 6/445 |
| 9,327,722 | B1* | 5/2016 | Johri | B60W 10/06 |
| 2018/0037219 | A1* | 2/2018 | Johri | B60W 30/18072 |
| 2021/0086736 | A1* | 3/2021 | Yao | B60W 50/0098 |

FOREIGN PATENT DOCUMENTS

| | | |
|---|---|---|
| DE | 10 2007 061 729 A1 | 6/2009 |
| DE | 10 2010 038 511 A1 | 2/2012 |
| DE | 10 2013 211 302 A1 | 12/2014 |
| DE | 10 2018 203 015 B3 | 5/2019 |
| WO | 2012/055635 A2 | 5/2012 |

OTHER PUBLICATIONS

Examination Report dated May 18, 2020 in corresponding German application No. 10 2020 100 961.5; 10 pages including Machine-generated English-language translation.

* cited by examiner

*Primary Examiner* — Erick D Glass
(74) *Attorney, Agent, or Firm* — Maier & Maier, PLLC

(57) ABSTRACT

A method for operating an electrical circuit, wherein the electrical circuit includes a DC converter, an inverter and an electric machine, wherein the inverter is connected on the direct current side to the output of the DC converter and on the alternating current side to the electric machine, wherein the electric machine is operated using a torque specification and/or a rotational speed specification, wherein the level of the output voltage of the DC converter is set as a function of a current torque specification and/or a current rotational speed specification.

20 Claims, 2 Drawing Sheets

METHOD FOR OPERATING AN ELECTRICAL CIRCUIT, ELECTRICAL CIRCUIT AND MOTOR VEHICLE

FIELD

The disclosure relates to a method for operating an electrical circuit, wherein the electrical circuit comprises a DC converter, an inverter and an electric machine, wherein the inverter is connected to the output of the DC converter on the direct current side and to the electric machine on the alternating current side, wherein the electric machine is operated using a torque specification and/or a rotational speed specification. The invention further relates to an electrical circuit and to a motor vehicle.

BACKGROUND

In motor vehicles with electric drives, as a rule, electric machines are used as traction electric motors. Said electric machines are operated, for example, from an energy storage such as a battery. In order to convert a direct current generated by the battery into an alternating current for operating the traction motor, an inverter can be used. The maximum electrical power which can be drawn from a battery and thus also the maximum suppliable output mechanical power of the traction motor here depend on the charge state of the battery. If the charge state of the battery decreases, then a direct current generated by the battery, which is on the inverter as intermediate circuit voltage, also decreases, so that a lower power can be converted into an alternating current by the inverter and used for operating the traction motor. In the case of a decreasing charge state of the battery, performance losses in the mechanical power that can be generated by the traction motor thus result. In order to compensate for the voltage drop in the intermediate circuit with decreasing charge state of the battery, the use of a DC converter is known from the prior art.

In DE 10 2018 203 015 B3, a method for controlling a battery current of a traction battery of a traction system is described. Here, a rectifier unit of the traction system converts a network voltage, using a specifiable feed current, into a controllable intermediate circuit voltage of an intermediate circuit of the traction system. Via an intermediate circuit voltage controller, an actual voltage value of the intermediate circuit voltage is adjusted to a setpoint value of the intermediate circuit voltage. The adjustment of the intermediate circuit voltage can here occur by means of a direct current controller or by control of a feed current to the intermediate circuit.

In DE 10 2013 211 302 A1, an energy storage device is described. The energy storage device here can be coupled in an electric drive system via a direct current intermediate circuit to an AC inverter. The AC inverter here receives the supply voltage of a direct current generation device of the energy storage device and converts it into a single- or multi-phase AC voltage for an electric machine. Here the direct current generation device can be set via a control device in such a manner that the output voltages and output currents of the energy storage device can be kept largely fluctuation-free, in particular without current or voltage ripples.

In DE 10 2007 061 729 A1, a method for detecting an electric error in an electric network of a motor vehicle is disclosed. The network here comprises a battery, a pulse inverter and a DC converter. Here it is provided that a battery current associated with the battery is determined by means of a battery current sensor, and a DC converter current associated with the DC converter is determined by means of a DC converter current sensor, wherein the level of an intermediate circuit current determined by means of the sensors is checked for the exceeding of a specifiable deviation.

In DE 10 2010 038 511 A1, an electric machine operated via a pulse inverter is described, wherein, via the pulse inverter a power and an operating mode of the electric machine are brought about. In order to increase an intermediate current voltage supplying the pulse inverter beyond the nominal voltage of a battery, a DC converter can be used.

SUMMARY

The invention is based on the problem of providing an improved method for operating an electrical circuit, which, in particular, enables a more efficient operation of an electric machine of the electrical circuit.

To solve the problem, in a method of the type mentioned at the start, it is provided according to the invention that the level of the output voltage of the DC converter is set as a function of a current torque specification and/or a current rotational speed specification.

The adjustment of the level of the output voltage of the DC converter here has the advantage that changes and in particular improvements of the operation of the electric machine can be made without changes on the direct current supply having to be made for this purpose. For example, in a given battery which is connected to the DC converter and via which the electric machine is operated, adjustments or improvements can be made during the operation of the electric machine without an exchange of the battery, for example, for a battery with higher battery voltage having to occur. In this manner, advantageously, in particular in the case of an already prespecified or existing electrical circuit, a more efficient operation of the electric machine of the electrical circuit can be achieved. This makes it possible to generate, for example, a power curve which is independent of the machine type in the case of an already established battery design and/or, in the case of an already established battery design, to increase the performance of the electric drive.

The adjustment of the output voltage of the DC converter occurs as a function of a current torque specification and/or a current rotation speed specification according to which the electric machine is operated currently or is to be operated. By the current rotational speed specification and/or the current torque specification, an operating point of the electric machine is specified, which describes a rotational speed and/or a torque of the electric machine to be set. In an electric machine used, for example, as traction electric motor of a motor vehicle, the rotational speed specification and/or the torque specification or an operating point comprising the rotational speed specification and/or the torque specification can be specified, for example, by a motor control device, wherein the current rotational speed specification describes the rotational speed to be set for a current driving state of the motor vehicle, and the electric machine is operated in accordance with the current rotational speed specification, and/or the current torque specification describes the torque to be set for the current driving state of the motor vehicle, and the electric machine is operated in accordance with the current torque specification. The adjustment of the level of the output voltage of the DC converter occurs as a function of the current torque specification and/or the current rotational speed specification and thus also as a function of the current operating state and/or of the operating state of the electric machine to be set.

The inverter of the electrical circuit can be, for example, a pulse inverter. The inverter is connected to the output of the DC converter on the direct current side, so that the output voltage of the DC converter represents an intermediate circuit voltage of the electrical circuit. On the direct current side, the DC converter can be connected, for example, to a direct current source. On the alternating current side, the inverter is connected to the electric machine, so that said electric machine can be operated using an alternating current generated by the inverter.

According to the invention, it can be provided that, by means of the set output voltage of the DC converter, a torque of the electric machine is changed, in particular increased. Here, as a function of the current torque specification and/or the current rotational speed specification, the output voltage of the DC converter can be increased in such a manner that the torque of the electric machine is increased beyond the value that would be possible without the DC converter, for example, by a source voltage of a direct current source connected on the direct current side of the inverter. The output voltage of the DC converter can here be set in such a manner that the intermediate circuit voltage is increased, so that, via the inverter, a greater torque of the electric machine can be generated. The amount by which the torque changes, that is to say is increased or decreased, can here depend in particular on the value of the current torque specification and/or on the value of the current rotational speed specification.

According to the invention, it can be provided that the torque of the electric machine is changed in such a manner that a torque decrease of the electric machine above a rated rotational speed is at least partially compensated and/or that a mechanical power of the electric machine above the rated rotational speed is at least sectionally constant and/or increases, in particular increases continuously, above the rated rotational speed with increasing rotational speed. In electric machines, it is known that, depending on the design, during the operation of the electric machine with a rotational speed above the rated rotational speed, the torque generated by the electric machine can decrease. Thereby, in electric machines, a decrease of the mechanical power generated by them can also occur during the operation of the electric machine at an operating point with a rotational speed above the rated rotational speed.

Due to the adjustment of the level of the output voltage of the DC converter as a function of a current torque specification and/or of a current rotational speed specification, it can be achieved that this torque decrease of the electric machine above the rated rotational speed is at least partially compensated. For example, by an adjustment of the output voltage, in particular by an increase of the output voltage, it can be achieved that a greater torque is generated by the electric machine, so that the torque decrease to be expected due to the design can be partially or completely compensated.

It is also possible that the level of the output voltage is adjusted in such a manner that the mechanical power of the electric machine is constant for all or at least some of the rotational speeds above the rated rotational speeds. For each acceptable torque specification and/or rotational speed specification, with which the electric machine can reasonably be operated, the level of the output voltage of the DC converter can thus be adjusted in such a manner that the mechanical power determined from the set torque of the electric machine and from the torque of the electric machine generated with adjustment of the output voltage of the DC converter is constant for all or at least some of the acceptable rotational speeds above the rated rotational speed. This enables, for example, an operation of the electric machine according to a traction force hyperbola which, starting at the rated rotational speed, or at least starting at a rotational speed above the rated rotational speed, provides a constant mechanical power of the electric machine via the rotational speed.

It is also possible to adjust the level of the output voltage of the DC converter in such a manner that the mechanical power of the electric machine, starting from the mechanical power at the rated rotational speed, increases for all acceptable rotational speeds above the rated rotational speed. Here, the level of the output voltage can be adjusted in such a manner that the mechanical power of the electric machine determined from the respective rotational speed and the respective torque set by the adjustment of the output voltage continuously increases starting at the rated rotational speed, so that, at higher rotational speeds, a higher mechanical power is also generated by the electric machine. This enables, for example, an operation of the electric machine according to an another traction force hyperbola, which, starting at the rated rotational speed or starting at a rotational speed above the rated rotational speed, provides a mechanical power of the electric machine which increases, in particular increases continuously, via the rotational speed.

By the adjustment of the level of the output voltage, it is possible, for example, that the electric machine is operated according to a characteristic curve which, starting at the rated rotational speed, provides a constant mechanical power for all or at least some of the acceptable rotational speeds of the electric machine which are above the rated rotational speed. Accordingly, an operation according to another characteristic curve is also possible, which, above the rated rotational speed, provides an increase of the mechanical power of the electric machine in case of increasing rotational speeds, for all the acceptable rotational speeds. The adjustment of the level of the output voltage provided according to the invention can thus be conceived of as an operation of the electric machine according to a new limit characteristic curve with constant or increased mechanical power. Moreover, a combination is also possible in which, above the rated rotational speed, the mechanical power of the electric machine is sectionally constant and sectionally increasing.

By the adjustment of the level of the output voltage, that is to say the targeted adjustment of the intermediate circuit voltage of the inverter via the DC converter, the maximum mechanical power of the electric machine can thus advantageously be increased and/or a shaping of a rotational speed-dependent torque characteristic curve or a rotational speed-dependent performance characteristic curve can be carried out, which can also be referred to as performance shaping. These dependencies can be stored, for example, in the form of a characteristic curve and/or of a characteristic diagram comprising multiple characteristic curves in a control device connected to the DC converter. The operation of the electric machine according to one of multiple possible characteristic curves can be specified, for example, by a motor control device of the motor vehicle and/or it can depend on a user selection of a driver of the motor vehicle.

According to the invention, it can be provided that the output voltage of the DC converter is set in such a manner that an efficiency of the electric machine for an operating point of the electric machine, which comprises the current torque specification and/or the current rotational speed specification, is increased.

This is possible, particularly if, at the operating point of the electric machine, a maximum torque is not acquired, or if a maximally increased torque is not generated by the adjustment of the level of the output voltage. At such an operating point, as a function of the current rotational speed specification and/or the current torque specification of the operating point, an improvement of the efficiency of the electric machine can be achieved by an adjustment of the level of the output voltage of the DC converter. The electric machine can thus advantageously be a operated with an increased efficiency at the operating point comprising the current torque specification and/or the current rotational speed specification. Thus, in particular for all the operating points below the respective possible maximum mechanical power for the respective current torque specification or the current rotational speed specification, the level of the output voltage of the DC converter can be adjusted, that is to say increased or decreased, in such a manner that the efficiency of the electric machine at the respective operating point is improved with respect to an operation without adjusted output voltage. These dependencies can also be stored, for example, in the form of a characteristic curve and/or of a characteristic diagram comprising multiple characteristic curves in a control device connected to the DC converter.

In a preferred embodiment of the invention, it can be provided that a DC converter is used, the input of which is connected to a direct current source, in particular to a fuel cell or a battery, wherein the output voltage of the DC converter is set as a function of a voltage of the direct current source and/or of a maximum acceptable discharge current of the direct current source. In the case of a DC converter connected to a direct current source, in addition to the dependency of the output voltage on one of the current torque specification and/or the current rotational speed specification, the voltage of the direct current source can also be taken into consideration, so that a compensation for the influence of a current charge state of the direct current source can occur. By taking into consideration a maximum acceptable discharge current of the direct current source, during the adjustment of the level of the output voltage, the electrical power that can be drawn from the direct current source can be taken into consideration. This makes it possible to take into consideration the total available electrical power, which represents a physical limit, as a limiting condition in the adjustment of the level of the output voltage of the DC converter. Thereby, it is advantageously possible to avoid the possibility that, as a result of an adjustment of the level of the output voltage of the DC converter, more electric energy is necessary than can be drawn from the direct current source.

According to the invention, it can be provided that the output voltage of the DC converter is set as a function of a maximum acceptable operating voltage of the electric machine. In particular, here, the maximum acceptable operating voltage of the electric machine, which represents a physical limit, can be used as a limit value for an increase of the output voltage of the DC converter. In this manner, it is advantageously possible to prevent the possibility that an output voltage which is above the maximum acceptable operating voltage of the electric machine is provided via the DC converter, so that, after inversion of the direct current by the inverter, there is no risk of damaging the electric machine by an alternating current generated with excessively high voltage.

According to the invention, it can be provided that, as inverter, a pulse inverter is used, and/or that, as electric machine, an asynchronous machine, a permanently excited synchronous machine or a separately excited synchronous machine is/are used.

For an electrical circuit according to the invention, it is provided that said circuit comprises a control device, a DC converter, an inverter and an electric machine, wherein on the direct current side the inverter is connected to the output of the DC converter and on the alternating current side it is connected to the electric machine, wherein the electric machine can be operated using a torque specification and/or a rotational speed specification, wherein the control device is configured for carrying out a method.

The control device can here comprise, for example, a storage device, in which at least one characteristic curve and/or at least one characteristic diagram comprising multiple characteristic curves for operating the electric machine is/are stored. The characteristic curves here can include an operation of the electric machine with a torque changed by adjustment of the level of the output voltage of the DC converter and/or an efficiency increased by adjustment of the level of the output voltage of the DC converter for one or more operating points of the electric machine. It is also possible that the control device is configured for regulating the output voltage of the DC converter. The control device can be connected, for example, to a motor control device of the motor vehicle via a communication line, so that, for example, a current torque specification specified by the motor control device and/or a current rotational speed specification specified by the motor control device and/or an operating point comprising the current torque specification and/or the current rotational speed specification can be evaluated by the control device and/or used for setting the level of the output voltage of the DC converter.

The advantages and embodiments represented above in reference to the method according to the invention apply correspondingly also to the electrical circuit according to the invention.

For a motor vehicle according to the invention, it is provided that it comprises an electrical circuit according to the invention.

Here, it can be provided according to the invention that the electric machine is a traction electric motor of the motor vehicle and/or that the DC converter is connected at its input to a traction energy storage of the motor vehicle, designed in particular as high-voltage battery or as fuel cell.

All the advantages and embodiments described in reference to the method according to the invention or in reference to the electrical circuit arrangement according to the invention apply correspondingly to the motor vehicle according to the invention.

BRIEF DESCRIPTION OF THE DRAWINGS

Additional advantages and details of the invention result from the embodiment examples described below as well as in reference to the drawings. Said drawings are diagrammatic representations and show.

DETAILED DESCRIPTION

Figure 1:
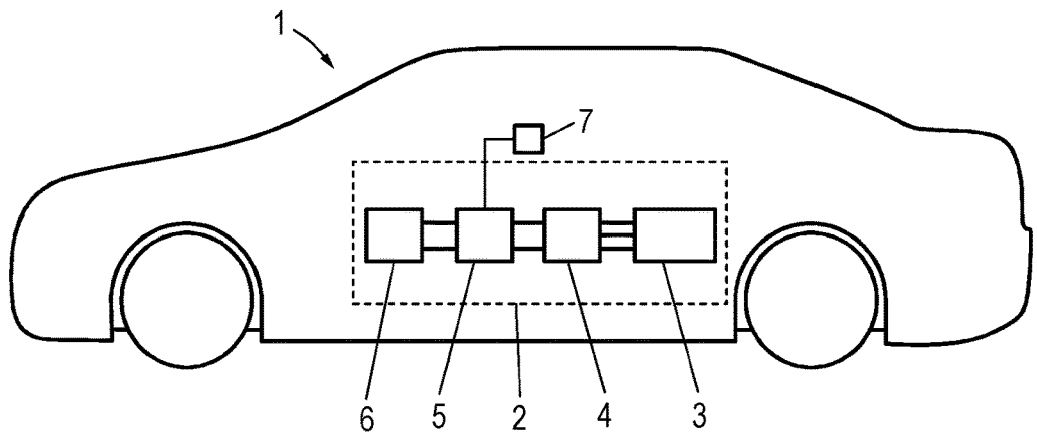
FIG. 1 a side view of a motor vehicle according to the invention.

In FIG. 1, a side view of a motor vehicle 1 according to the invention is represented. The motor vehicle 1 comprises an electrical circuit 2 according to the invention. The electrical circuit 2 comprises an electric machine 3, an inverter 4, a DC converter 5 as well as a direct current source 6. Here, the inverter 4 is connected to the electric machine 3 on its alternating current side. The direct current side of the inverter 4 is connected to the DC converter 5. The DC converter 5 is moreover connected to the direct current source 6. The inverter 4 is implemented as a pulse inverter, and the electric machine 3 is designed as an asynchronous machine, a permanently excited synchronous machine or a separately excited synchronous machine.

A direct current, which is converted via the inverter 4 into an alternating current for operating the electric machine (3), can be drawn from the direct current source 6. The electric machine 3 here represents a traction electric motor of the motor vehicle 1, by which the motor vehicle 1 can be moved in an electric driving operation. The direct current source 6 represents a traction energy storage of the motor vehicle 1 and can be implemented, for example, as a high-voltage energy storage such as a high-voltage battery or a fuel cell. The direct current source can here have, in particular, a nominal voltage between 400 V and 840 V, in particular of 400 V, 800 V or 840 V. The voltage provided by the direct current source 6 represents the input voltage of the DC converter 5. This input voltage can be converted by the DC converter 5 into an output voltage of the DC converter 5, wherein the output voltage can be higher or lower than the input voltage of the DC converter 5. The output voltage generated by the DC converter 5 represents the input voltage on the direct current side of the inverter 4 or an intermediate circuit voltage of the electrical circuit 2.

The motor vehicle 1 moreover comprises a control device 7, by means of which the level of the output voltage of the DC converter 5 can be set as a function of a current torque specification and/or as a function of a current rotational speed specification and/or of an operating point of the electric machine 3, which comprises the current torque specification and/or the current rotation speed specification. The current torque specification and/or the current rotational speed specification and/or the operating point can be transmitted, for example, from a motor control device (not represented here) of the motor vehicle to the control device 7.

The current torque specification and/or rotational speed specification, specified, for example, by the motor control device, is used to operate the electric machine at an operating point determined by the motor control device. By an adjustment of the output voltage of the DC converter 5 as a function of the current torque specification and/or of the current rotational speed specification by the control device 7, an operation of the electric machine 3 with a changed torque can occur. In particular, an operation of the electric machine 3 with an increased torque, a constant and/or increased mechanical power above the rated rotational speed and/or an increased efficiency is possible, as is explained below.

Figure 2:
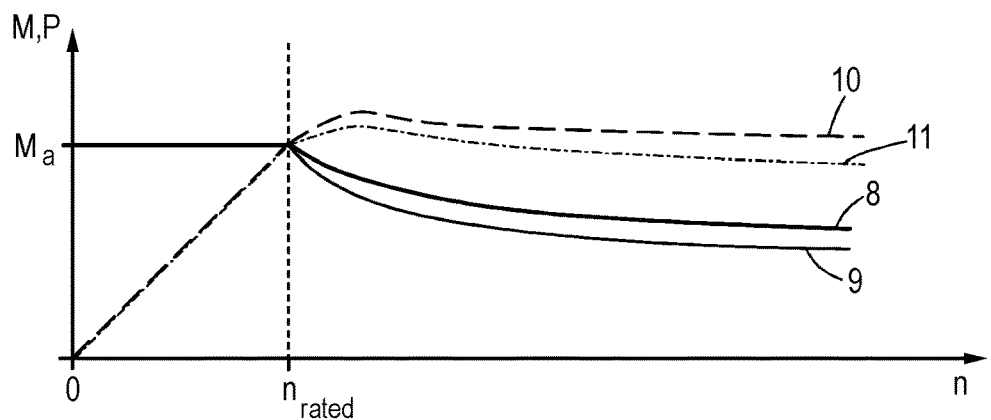
FIG. 2 a first diagram for explaining embodiment examples of a method according to the invention, FIG. 3 a second diagram for explaining embodiment examples of a method according to the invention, and FIG. 4 a third diagram for explaining embodiment examples of a method according to the invention.

In FIG. 2, a first diagram is represented, in which a rotational speed n of the electric machine 3 is plotted on the abscissa, and a torque M and a mechanical power P of the electric machine 3 are plotted on the ordinate. Here, the torque M of the electric machine 3 is depicted by the respective curves represented with solid lines, and the mechanical power P of the electric machine 3 is depicted by the respective curves represented with dashed lines.

As can be seen, in the rotational speed range between 0 and a rated rotational speed $n_{rated}$, the electric machine 3 has a constant torque $M_a$. Due to the constant torque $M_a$ in the range between 0 and $n_{rated}$, the mechanical power P of the electric machine 3 increases correspondingly in a constant manner in the range between 0 and $n_{rated}$.

Two torque curves 8, 9 are represented, each representing the course of the torque M versus the rotational speed n. Here, the curve 8 shows, as an example, the course of the torque of a permanently excited synchronous machine, and the curve 9 shows the course of the torque of an asynchronous machine, in each case without adjustment of the level of the output voltage of the DC converter 5. The mechanical power P resulting in each case from the torque M and the rotational speed n is plotted for the permanently excited synchronous machine on curve 10 and correspondingly for the asynchronous machine on curve 11 versus the rotational speed n. Due to the design, above the rated rotational speed $n_{rated}$, the torque of the permanently excited synchronous machine as well as the torque of the asynchronous machine decrease. Correspondingly, a mechanical power P of the electric machine 3 which decreases for higher rotational speeds also results from the power curves 10 and 11.

This decrease of the torque or the decrease of the mechanical power can be at least partially compensated by an adjustment of the output voltage of the DC converter 5. This is represented in FIG. 3.

Figure 3:
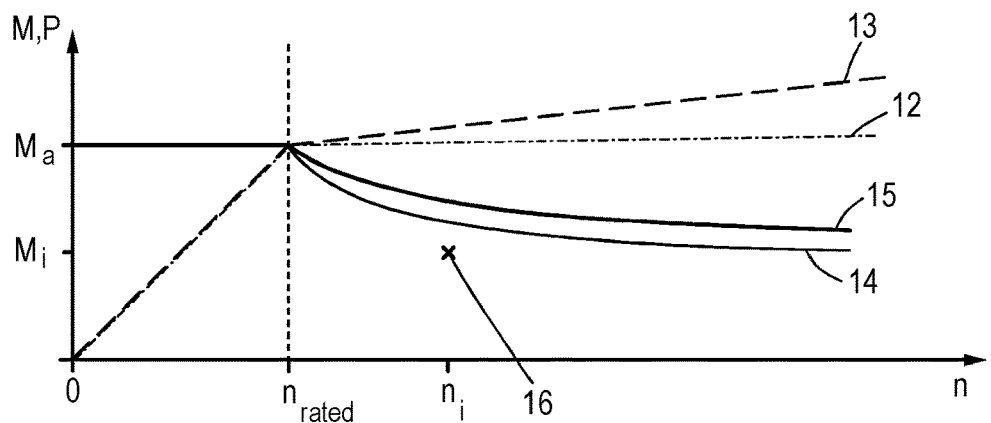

In FIG. 3, a second diagram is represented, wherein the axes and the form of representation correspond to the first diagram from FIG. 2. In FIG. 3, two power curves 12, 13 are depicted, which represent the mechanical power P of the electric machine 3 versus the rotational speed n. Here, the first power curve 12 has a course in which the mechanical power of the electric machine 3 remains constant above the rated rotational speed $n_{rated}$. The constant mechanical power is generated in that, as a function of the current torque specification and/or of the current rotational speed specification of the electric machine 3, the output voltage of the DC converter 5 is adjusted in such a manner that the torque of the electric machine 3 is increased as a function of the rotational speed, so that, for all the acceptable rotational speeds above the rated rotational speed $n_{rated}$, a constant mechanical power of the electric machine 3 results. The torque curve associated with the first power curve 12 is represented as first torque curve 14.

It is also possible to adjust the level of the output voltage of the DC converter 5 in such a manner that, starting at the mechanical power $P_a$, at the rotational speed $n_{rated}$, an increased mechanical power of the electric machine 3 is generated. Here, the output voltage of the DC converter 5 is adjusted in such a manner that the mechanical power in accordance with the second power curve 13 for rotational speeds increases continuously with the rotational speed above the rated rotational speed $n_{rated}$. The torque curve associated with the second power curve 13 is represented as curve 15.

It can be seen that by the adjustment of the level of the output voltage of the DC converter 5, a decrease of the torque of the electric machine 3 above the rated rotational speed can be at least partially compensated, or a mechanical power of the electric machine can be kept constant above the rated rotational speed, or, in particular for all acceptable torque specifications and/or rotational speed specifications, it can be increased with respect to the mechanical power at the rated rotational speed $n_{rated}$.

At operating points of the motor vehicle which are below a maximum possible mechanical power of the electric machine 3, the level of the output voltage of the DC converter 5 can be adjusted in such a manner that, for the respective operating point, an improved efficiency results. As an example, an operating point 16 is represented, which comprises a current rotational speed specification $n_i$ as well as a current torque specification $M_i$. By the control device 7, here, as a function of the current rotational speed specification $n_i$ and the current torque specification $M_i$, an adjustment of the level of the output voltage of the DC converter 5 is carried out in such a manner that the electric machine 3 is operated at the operating point 16 with an improved efficiency. The efficiency of the electric machine 3 is here increased with respect to an operation of the electric machine 3 at the operating point 16 without adjustment of the output voltage.

Figure 4:
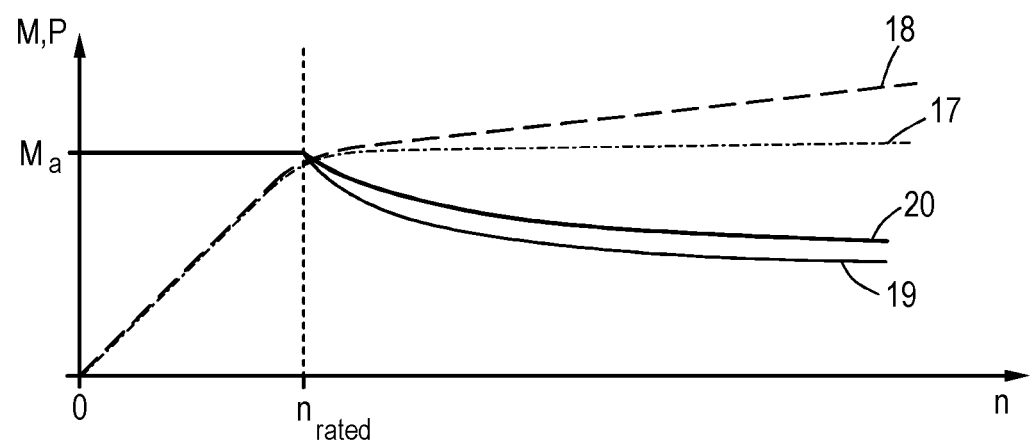

In addition to a power curve with a constant course starting at the rated rotational speed, a curved course of the curve corresponding to a traction force hyperbola is also possible, in which, at least for some of the acceptable rotational speeds above the rated rotational speed $n_{rated}$, a constant mechanical power of the electric machine 3 results. Such an embodiment example is represented in FIG. 4 as a third power curve 17, wherein the axes and the form of representation correspond to the preceding diagrams. For the mechanical power as well, in addition to a constant increase starting at the rated rotational speed, other curve courses, for example, non-linear curve courses are also possible, in which the mechanical power increases with the rotational speed with a constant slope only starting at a rotational speed above the rated rotational speed. Such an embodiment example is represented as fourth power curve 18. A curve course corresponding to a traction force hyperbola, in which the mechanical power increases continuously with variable slope, is also possible. The torque curve associated with the third power curve 17 is represented as curve 19, and the torque curve associated with the fourth power curve 18 is represented as curve 20.

The respective course of the power curves 12, 13, 17, 18 and/or the associated values for the level of the output voltage 5 can, for example, be stored as characteristic curves in a storage device of the control device 7 of the motor vehicle 1. An operation of the electric machine 3 according to one of the power curves 12, 13, 17, 18 can be specified, for example, by a motor control device of the motor vehicle 1 and/or switched over as a function of a user input.

The adjustment of the output voltage of the DC converter 5 here always occurs taking into consideration a maximum discharge current of the direct current source 6 as well as a maximum acceptable operating voltage of the electric machine 3. Thereby, it can be achieved that the electric machine 3 is operated always within the acceptable physical limits. In addition, it is possible that the adjustment of the output voltage of the DC converter 5 also occurs as a function of a voltage of the direct current source 6, so that, in addition, a voltage of the direct current source 6 which decreases due to a decrease of the charge state can also be compensated during the operation of the electric machine 3.

By the adjustment of the level of the output voltage of the DC converter 5 as a function of the current torque specification and/or of the current rotational speed specification, an improved operation of the electric machine 3 is possible. On the one hand, the efficiency of the operation of the electric machine 3 can be improved, and, on the other hand the electric machine 3 can be operated with in particular a higher torque compared to what would be possible if an unchanged voltage of the direct current source 6 were used as intermediate circuit voltage of the inverter 4. Moreover, by the adaptation of the level of the output voltage of the DC converter 5, an operation of the electric machine 3 according to adjustable characteristic curves with improved efficiency and/or performance of the electric machine 3 (performance shaping) is enabled. This makes it possible, for example, to generate a power curve which is independent of machine type in the case of an already established battery design and/or to increase a performance of the electric drive of a motor vehicle 1 in the case of an already established battery design.

The invention claimed is:

1. A method for operating an electrical circuit, wherein the electrical circuit comprises:
 a DC converter, an inverter and an electric machine, wherein the inverter is connected on the direct current side to the output of the DC converter and on the alternating current side to the electric machine, wherein the electric machine is operated using a torque specification and/or a rotational speed specification,
 wherein the level of the output voltage of the DC converter is set as a function of a current torque specification and/or a current rotational speed specification
 wherein a torque of the electric machine is compensated and maintained when a rotational speed of the electric machine is above a predetermined value.

2. The method according to claim 1, wherein, by the set output voltage of the DC converter, the torque of the electric machine is changed, in particular increased.

3. The method according to claim 2, wherein the torque of the electric machine is changed in such a manner that a torque decrease of the electric machine above a rated rotational speed is at least partially compensated and in that a mechanical power of the electric machine above the rated rotational speed is at least sectionally constant and increases above the rated rotational speed with increasing rotational speed, in particular continuously.

4. The method according to claim 1, wherein the output voltage of the DC converter is set in such a manner that an efficiency of the electric machine for an operating point of the electric machine, comprising the current torque specification and/or the current rotational speed, is increased.

5. The method according to claim 1, wherein a DC converter is used, the input of which is connected to a direct current source, in particular to a fuel cell or a battery, wherein the output voltage of the DC converter is set as a function of a voltage of the direct current source and/or a maximum acceptable discharge current of the direct current source.

6. The method according to claim 1, wherein the output voltage of the DC converter is set as a function of a maximum acceptable operating voltage of the electric machine.

7. The method according to claim 1, wherein an inverter, a pulse inverter is used and/or in that, as electric machine, an asynchronous machine, a permanently excited synchronous machine and/or a separately excited synchronous machine is used.

8. An electrical circuit comprising:
 a control device, a DC converter, an inverter and an electric machine, wherein the inverter is connected to the output of the DC converter on the direct current side and to the electric machine on the alternating current side, wherein the electric machine can be operated using a torque specification and/or a rotational speed specification,
- wherein in that the control device is configured for carrying out a method for operating an electrical circuit, wherein the electrical circuit further comprises the DC converter, an inverter and an electric machine, wherein the inverter is connected on the direct current side to the output of the DC converter and on the alternating current side to the electric machine, wherein the electric machine is operated using a torque specification and/or a rotational speed specification,
- wherein the level of the output voltage of the DC converter is set as a function of a current torque specification and/or a current rotational speed specification,
- wherein a torque of the electric machine is compensated and maintained when a rotational speed of the electric machine is above a predetermined value.

9. A vehicle comprising an electrical circuit according to claim 8.

10. A motor vehicle according to claim 9, wherein the electric machine is a traction electric motor of the motor vehicle and/or in that the DC converter is connected at its input to a traction energy storage, implemented in particular as high-voltage battery or as fuel cell, of the motor vehicle.

11. The method according to claim 2, wherein the output voltage of the DC converter is set in such a manner that an efficiency of the electric machine for an operating point of the electric machine, comprising the current torque specification and/or the current rotational speed, is increased.

12. The method according to claim 3, wherein the output voltage of the DC converter is set in such a manner that an efficiency of the electric machine for an operating point of the electric machine, comprising the current torque specification and/or the current rotational speed, is increased.

13. The method according to claim 2, wherein a DC converter is used, the input of which is connected to a direct current source, in particular to a fuel cell or a battery, wherein the output voltage of the DC converter is set as a function of a voltage of the direct current source and/or a maximum acceptable discharge current of the direct current source.

14. The method according to claim 3, wherein a DC converter is used, the input of which is connected to a direct current source, in particular to a fuel cell or a battery, wherein the output voltage of the DC converter is set as a function of a voltage of the direct current source and/or a maximum acceptable discharge current of the direct current source.

15. The method according to claim 4, wherein a DC converter is used, the input of which is connected to a direct current source, in particular to a fuel cell or a battery, wherein the output voltage of the DC converter is set as a function of a voltage of the direct current source and/or a maximum acceptable discharge current of the direct current source.

16. The method according to claim 2, wherein the output voltage of the DC converter is set as a function of a maximum acceptable operating voltage of the electric machine.

17. The method according to claim 3, wherein the output voltage of the DC converter is set as a function of a maximum acceptable operating voltage of the electric machine.

18. The method according to claim 4, wherein the output voltage of the DC converter is set as a function of a maximum acceptable operating voltage of the electric machine.

19. The method according to claim 5, wherein the output voltage of the DC converter is set as a function of a maximum acceptable operating voltage of the electric machine.

20. The method according to claim 2, wherein an inverter, a pulse inverter is used and/or in that, as electric machine, an asynchronous machine, a permanently excited synchronous machine and/or a separately excited synchronous machine is used.

* * * * *